Dec. 18, 1923.
O. H. LEHMANN
1,477,570
METHOD OF MAKING BALL BEARINGS
Filed Sept. 2, 1922
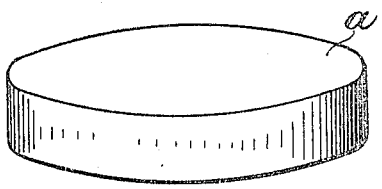
Fig. 1.
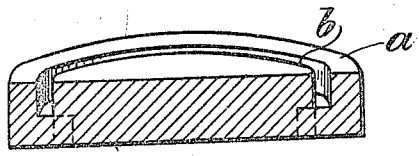
Fig. 2.
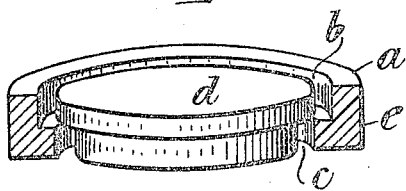
Fig. 3.
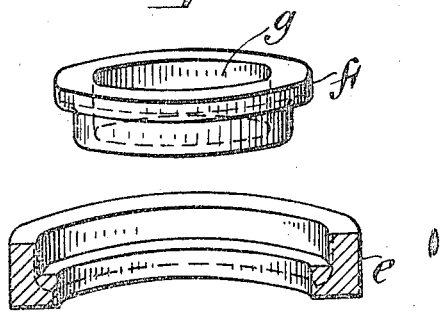
Fig. 4.
Fig. 5.
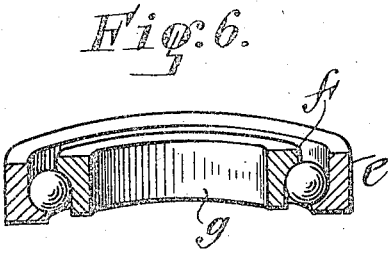
Fig. 6.
WITNESSES
INVENTOR
Otto H. Lehmann
BY Redding
ATTORNEYS Patented Dec. 18, 1923.

1,477,570

UNITED STATES PATENT OFFICE.

OTTO HERMANN LEHMANN, OF LANCASTER, PENNSYLVANIA, ASSIGNOR TO THE BEARINGS COMPANY OF AMERICA, OF LANCASTER, PENNSYLVANIA, A CORPORATION OF NEW JERSEY.

METHOD OF MAKING BALL BEARINGS.

Application filed September 2, 1922. Serial No. 585,851.

*To all whom it may concern:*

Be it known that I, OTTO H. LEHMANN, a citizen of the United States, residing at Lancaster, in the State of Pennsylvania, have invented certain new and useful Improvements in Methods of Making Ball Bearings, of which the following is a specification, reference being had to the accompanying drawing, forming a part hereof.

The object of this invention is to provide for the economical production of ball races for ball bearings, particularly of the type known as angular contact radial bearings. In accordance with the invention both ball races are formed from a single disc of metal, which may be cut from a solid bar or stamped or forged. In one face of the blank a concentric groove of determined width is cut partway through the blank, usually halfway through, this cut being commonly known in the art as a trepanning cut. Then a similar groove, but of a different radius, is cut from the other face of the disc far enough to meet the first cut. The inside diameter of the cut of larger radius is preferably the same as the outside diameter of the cut of smaller radius. Then the smaller disc, separated from the outer ring thus formed is trepanned or drilled out concentrically, leaving a ring of the required thickness. The two annular members thus formed are finished by turning, so as to form a proper cup or cone and are then hardened and ground as usual. The invention will be more fully explained hereafter with reference to the accompanying drawing in which it is illustrated and in which—

Figure 1 is a view in perspective of the blank from which the raceways are formed.

Figure 2 is a view of the same in section after the first trepanning has been made.

Figure 3 is a similar view after the second trepanning has been made, the center member being shown in full perspective.

Figure 4 is a view in perspective of the center member after it has been trepanned or drilled out, the shaping of the inner raceway to form the cone being indicated by broken lines.

Figure 5 is a view in section and perspective of the outer raceway, the shaping thereof to form the cup being indicated by broken lines.

Figure 6 is a view in section and perspective of the completed bearing, with the balls in position.

In the practice of the improved method a disc or flat washer or blank *a*, of suitable diameter and thickness is first prepared in any convenient manner, as by cutting from a solid bar or stamping or forging. It is then subjected to a trepanning cut, as indicated at *b* in Figure 2, by which a concentric groove is formed in one face of the disc part-way through the same, usually about half-way through. A trepanning cut as indicated at *c* in Figure 3, is then made from the other face of the disc, forming a concentric groove which meets the groove *b*. The outer wall of the groove of smaller radius, such as the groove *c*, usually, but not necessarily registers with the inner wall of the other groove *b* so that the central portion *d* is separated from the outer ring *e* without further operation. By boring or otherwise, as indicated at *e* in Figure 4, the central portion of the central member *d* is then removed and both annuli *e* and *f* are shaped by turning, as indicated by broken lines in Figures 4 and 5, to form the two raceways of the bearing, the two annuli being further finished by hardening and grinding as usual.

It will be observed that the improved method is practiced with a maximum of economy of material and of operations.

I claim as my invention:

1. The method of making ball bearings which consists in providing a suitable blank, cutting a concentric groove from one face of the blank, cutting a concentric groove of different radius from the other face of the blank to meet the first cut and thereby forming two members of the bearing, and finishing such members.

2. The method of making ball bearings which consists in providing a suitable blank, cutting a concentric groove from one face of the blank, cutting a concentric groove of different radius from the other face of the blank to meet the first cut, removing the central portion of the inner member thus formed and finishing the two annuli so formed.

This specification signed this 30th day of August, A. D. 1922.

OTTO HERMANN LEHMANN.